United States Patent [19]

Hilsum et al.

[11] 4,003,081

[45] Jan. 11, 1977

[54] DISPLAY SYSTEMS WITH CONTROLLED COLOR FILTERING

[75] Inventors: Cyril Hilsum; Ian Alexander Shanks, both of Malvern, England

[73] Assignee: The Secretary of State for Defence in Her Britannic Majesty's Government of the United Kingdom of Great Britain and Northern Ireland, London, England

[22] Filed: Jan. 20, 1975

[21] Appl. No.: 542,625

[30] Foreign Application Priority Data

Jan. 21, 1974 United Kingdom ............... 2764/74

[52] U.S. Cl. .................................. 358/64; 358/61
[51] Int. Cl.² ..................................... H04N 9/16
[58] Field of Search ................. 358/61, 56, 64, 66, 358/59, 81; 343/5 CD; 350/160 LC

[56] References Cited

UNITED STATES PATENTS

| 2,758,298 | 8/1956 | Sunstein | 358/81 X |
|---|---|---|---|
| 3,569,614 | 3/1971 | Hanlon | 358/56 |
| 3,669,525 | 6/1972 | Adams et al. | 350/160 LC X |
| 3,679,290 | 7/1972 | Adams et al. | 350/160 LC X |
| 3,711,180 | 1/1973 | Klinger et al. | 358/61 X |
| 3,712,954 | 1/1973 | Oliver et al. | 358/61 |
| 3,781,465 | 12/1973 | Ernstoff et al. | 358/61 X |
| 3,816,786 | 6/1974 | Churchill et al. | 350/160 LC X |
| 3,858,209 | 12/1974 | Zulch | 343/5 CD X |

*Primary Examiner*—Robert L. Griffin
*Assistant Examiner*—Mitchell Saffian
*Attorney, Agent, or Firm*—Pollock, VandeSande & Priddy

[57] ABSTRACT

A color display system, for example an electronic data display or a color television system incorporates a display screen, for example a cathode ray tube phosphor, and at least one liquid crystal color filter. The screen emits light in the form of visual information in at least two colors, and the filter is controlled electrically in such a way that the colors transmitted by the screen may be switched according to input signal used to energize the screen.

6 Claims, 11 Drawing Figures

DISPLAY SYSTEMS WITH CONTROLLED COLOR FILTERING

The present invention relates to color display systems, particularly systems for the display of electronic data and colour television systems.

Electrically operated color displays are used for a wide range of applications. For instance, in the display of data, eg for air traffic control purposes, there is a requirement for a system which can receive data signals from at least two separate sources, for example a radar processor and a computer, and which can display the data on a single display in such a form that the source of the data can be identified. One prior art approach for meeting the requirement is based on the development of a cathode ray tube whose phosphor screen is arranged to be energized to emit light of one color by applying to the tube a voltage or electric current of one magnitude and arranged to emit light of another color by applying to the tube a voltage or electric current of another magnitude. The tube can thus be used to display data from one source in one color and data from another source in another color.

Another application of electrically operated color displays is in color television. Conventionally, a cathode ray tube is constructed and operated so as to produce an image in three colors. The tube normally incorporates three cathode ray guns each of which receives a separate video signal corresponding to one of the three colors. Three electron beams are produced by the guns and these are directed onto a phosphor through a mask known as a 'shadow mask'. The phosphor is made up from an array of three kinds of phosphor spots which respectively emit in the three required colors. The shadow mask ensures that the electron beam in each case is directed onto the appropriate phosphor spots to produce the appropriate color. One disadvantage of conventional color television as described is that the tubes are expensive to manufacture particularly because the shadow masks need to be located very precisely in position in the tubes.

According to the present invention a display system includes a light emitting screen capable of being energized to emit light in the form of a visual image in at least two colors of the visible spectrum by different input signals, an electrically controllable filter located in front of the screen, the filter comprising a layer of liquid crystal material capable of separately passing different colors, including at least two of those of the image emitted by the screen, depending on the nature of the molecular arrangement within the layer, an electrode structure for applying an electric field across the layer, and means for controlling the electric field applied across the layer to select the molecular arrangement within the layer and select which of the colors emitted by the screen is to be passed by the filter according to the input signal applied to energize the screen.

The screen may comprise the phosphor of a cathode ray tube, or an electroluminescent display.

In one form of the invention in which the filter is constructed so as to pass at least two of the colors emitted by the screen, the screen is energized to write electronic data constituting the visual image by input signals derived from at least two separate sources, eg a radar processor and a computer, and the filter is controlled so as to pass the data in one color when the data is derived from one of the sources and in another color when the data is derived from the other source or another of the sources. Thus in this form the invention provides an alernative approach to the electronic data display requirement mentioned above. However, by allowing the displayed color to be selected according to the electric field applied across the liquid crystal layer instead of according to the voltage or electric current used to energize the cathode ray tube screen as in the prior art mentioned above, the invention in this form allows the screen to be energized in a conventional way and hence with less complication and also allows changing between the colors to be achieved by switching at low voltage levels which are possibly compatible with standard integrated circuit voltage levels.

In this form of the invention the control means may for example be an electronic control unit capable of (a) receiving electronic data signals from at least two sources, (b) feeding the appropriate data signals to the display screen to energize the display screen to emit light in the form of that data and (c) controlling the electric field applied across the liquid crystal layer so that the color passed by the filter is indicative of the source of the signals fed to the display screen.

In another form of the invention the system constitutes a color television system wherein the different input signals are different color video signals. An additional liquid crystal filter similar to the first mentioned filter may be employed and three colors emitted by the screen may be selectively filtered by rapidly switching the combination of the two filters between three different states to pass the three colors, 'frame sequentially' as described below.

In an alternative color television system the first mentioned filter may be used in conjunction with a plurality of first stripes of a first additional filter having a fixed transmission characteristic and a plurality of second stripes alternating with the first stripes, the second stripes being of a second additional filter having a fixed transmission characteristic different from that of the first additional filter. Three colors emitted by the screen may be selectively filtered by controlling the liquid crystal filter to select the first color and by selecting the other two colors by the stripes all in a frame sequential manner as described below.

The color television systems of these alternative forms of the invention can use a cathode ray tube which is possibly simpler and cheaper than conventional color television tubes since the tube needs only one cathode gun, no shadow mask and no arrangement of the phosphor into different kinds of spots.

The filter comprising the liquid crystal layer may be of one of three kinds herein referred to as kinds X, Y and Z. Kind X is that described in copending United Kingdom Patent Application No. 34162/73 and comprises a structure of a layer of birefringent material in combination with the liquid crystal layer which is arranged to have an electrically adjustable optical activity for this application, the combination being located between two polarizers. Changing the nature of the electric field across the liquid crystal layer, eg between two different magnitudes (one of which may be zero) or two different frequencies, is equivalent to rotating the plane of polarization of light passing through the structure and changing the color transmitted through the one of the polarizers which acts as an analyzer. For example the layer may be a twisted nematic layer formed from the material

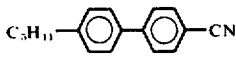

located between glass slides previously unidirectionally rubbed on their inner surfaces in orthogonal directions.

Kind Y in the same as kind X except that one of the polarizers is replaced by a dichroic dye dissolved in the liquid crystal layer.

Kind Z is that described in copending United Kingdom Patent Application No. 45850/73 and comprises a collection of particles, eg small glass spheres of 1–10 microns diameter, suspended in the liquid crystal layer. The liquid crystal layer has two optical dispersions (refractive indexes as a function of wavelength) which depend on and which may be selected according to the electric field applied across the layer. The electric field required to provide one of the dispersions may be zero. The particles have an optical dispersion which is different from those of the liquid crystal layer. Different colors may be transmitted by changing the applied electric field to match the refractive index of the layer with that of the particles at different wavelengths.

In each kind the electric fields are applied conventionally, eg between tin oxide electrodes deposited on the inner surfaces of glass slides between which the liquid crystal layer is sandwiched.

Embodiments of the present invention will now be described by way of example with reference to the accompanying drawings, in which.

Figure 2:
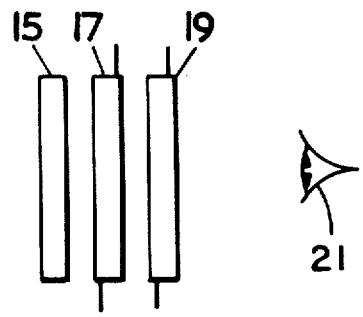
FIG. 2 is a schematic diagram of the display part of a color television system.
Figure 3A:
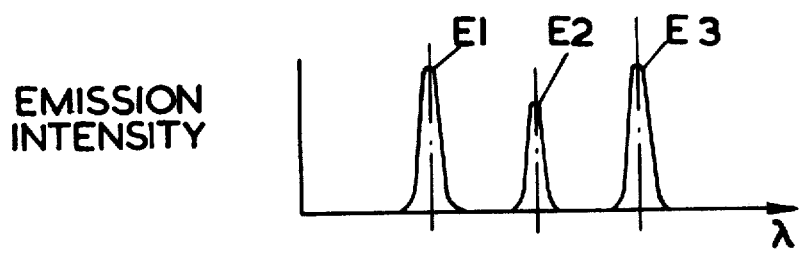
Figure 3B:
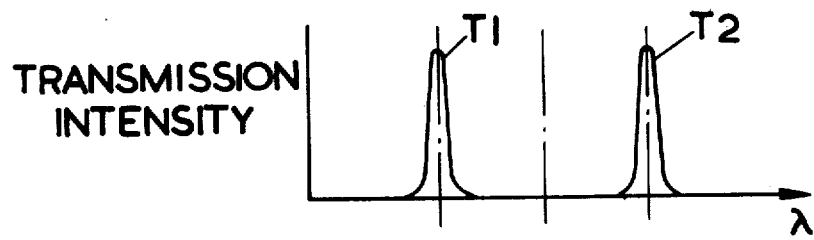
Figure 3C:
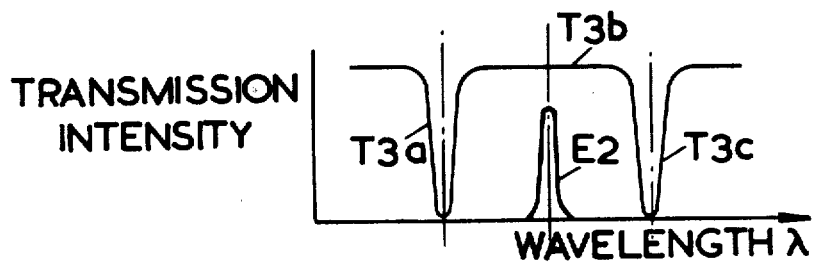
Figure 4:
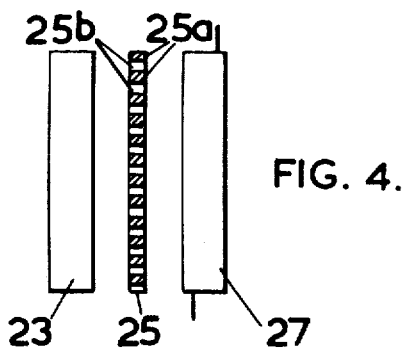

FIGS. 3a, 3b, and 3c are graphs illustrating operation of the system shown in FIG. 2;

FIG. 4 is a schematic diagram of the display part of an alternative color television system; and FIG. 5a, 5b, 5c, 5d and 5e are graphs illustrating operation of the system shown in FIG. 4.

Figure 1:
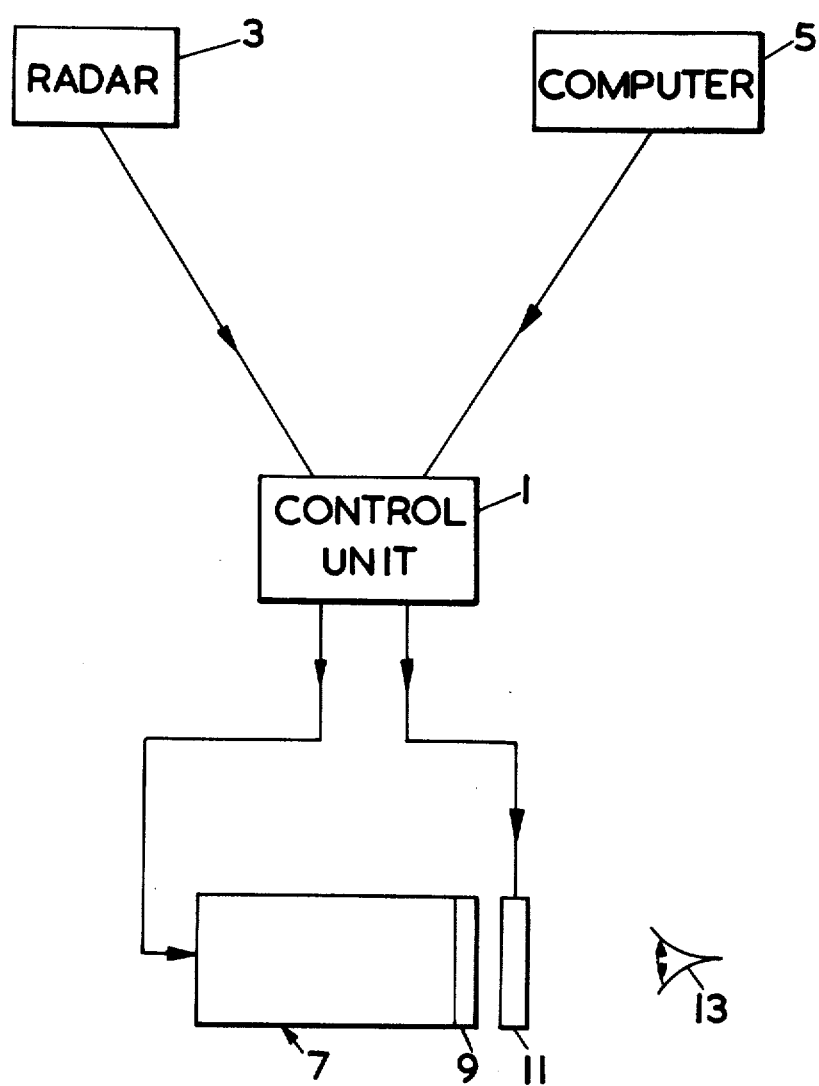
FIG. 1 is a schematic diagram of an electronic data color display.

In the system illustrated in the FIG. 1, an electronic control unit 1 receives as a first input the output signals of a radar 3 and as a second input the output signals of a computer 5. It gates (feeds) either the first input or the second input as appropriate, but not both, to a cathode ray tube 7 having a multi-color phosphor screen 9. The data contained in the input so gated is displayed in at least two colors by the phosphor screen 9.

An electrically controllable liquid crystal color filter 11, for example of one of the kinds X, Y or Z described above, is located in front of the phosphor screen 9. At times when the control unit 1 is in the state in which it gates the first input, namely that from the radar 1, to the cathode ray tube 7 the control unit 1 also generates a voltage V1 which is applied across the liquid crystal layer (not shown specifically) of the filter 11. At times when the control unit 1 is in the state in which it gates the second input, namely that from the computer 5, to the cathode ray tube 7 it also generates a voltage V2 which is applied across the liquid crystal layer of the filter 11. The voltages V1 and V2 are chosen such that the filter 11 passes light of one color, for example blue, emitted by the phosphor screen 9 when the voltage V1 is applied across the liquid crystal layer of the filter 11 and such that the filter 11 passes light of another color, for example yellow, emitted by the phosphor screen 9 when the voltage V2 is applied across the liquid crystal layer of the filter 11. Either the voltage V1 or the voltage V2 may be zero if the particular construction of the filter 11 permits passing of a single color by zero applied voltage.

In operation the state of the control unit 1 is selected either manually by an operator as required or automatically by a computer which may be the computer 5 (via another connection not shown). When the cathode ray tube 7 receives data from the radar 3 the data is displayed in a plurality of colors by the phosphor screen 9 but only one of these colours is observed by an eye 13 of an observer to be passed by the filter 11. Thus, the data appears in one color only, for example blue. When the cathode ray tube 7 receives data from the computer 5 the data is again displayed in a plurality of colors by the phosphor screen 7 but in this case another color is observed by the eye 13 to be passed by the filter 11. Thus, the data appears in a different color, for example yellow.

The phosphor screen 9 may for example be a P4 or a P18 phosphor (according to the JEDEC International Classification System) which gives light emission peaks in the yellow and blue regions of the spectrum.

The control unit 1 may for example (in a simple form) include a pair of two input/one output switches ganged together, one for applying either its first or second input to the cathode ray tube 7 and the other for applying either a voltage V1 from a first voltage source (not shown) within the control unit 1 or a voltage V2 from a second voltage source (not shown) within the control unit 1 to the liquid crystal layer of the filter 11.

The difference in magnitude between the voltages V1 and V2 which is required to switch the filter 11 depends on the colors to be passed by the filter 11 and the nature of the filter 11 itself. However if the filter 11 is of the kind X described above and is arranged to switch between the colors yellow and blue by the known twisted nematic liquid crystal effect then a voltage magnitude difference of about 5 volts (direct, pulsed or r.m.s. alternating) is typically required.

In an alternative system to that shown in FIG. 1 the filter 11 is constructed so that in one region thereof it can pass one color and in another region thereof it can pass another color contemporaneously. For example the electrodes (not shown) used for applying electric fields across the liquid crystal layer of the filter 11 may be constructed so as to energize selected regions of the layer, e.g. in a known X/Y matrix form such that selected intersections between the X and Y electrodes may be separately operated. In such a form the filter 11 allows data from the radar 3 and from the computer 5 to be displayed contemporaneously. In this case the control unit may be arranged to gate the respective inputs from the radar 3 and the computer 5 to different areas of the phosphor screen 7 contemporaneously.

FIG. 2 shows part of the construction (the display part) and FIGS. 3a to 3c illustrate the basic operation of a color television system embodying the invention. A first liquid crystal filter 17 is located in front of a light emitting screen 15, eg a cathode ray tube phosphor, and a second liquid crystal filter 19 is located in front of the filter 17. The filters 17 and 19, which may both be of one of the kinds X, Y, Z described above, are shown separated from one another and from the screen for clarity; in practice all three will be touching to form a sandwich structure. The screen 15, e.g. a P22 mixed color phosphor, has three emission peaks E1, E2 and E3 at different wavelengths λ as shown in FIG. 3a.

The filters 17 and 19 both have two states, depending on the electric fields applied across their liquid crystal layer (not shown specifically), in which different colors are transmitted by them. These states will be designated A and B for convenience.

The A states are illustrated together in FIG. 3(b) and consist of a transmission peak T1 for the filter 17 coinciding with the emission peak E1 (FIG. 3a), and a transmission peak T2 for the filter 19 coinciding with the emission peak E3. Both filters 17 and 19 are non-transmitting at other wavelengths in the A state.

The B states are illustrated in FIG. 3(c) and consist of a transmission minimum T3a for the filter 17 coinciding with the emission peak E1 (FIG. 3a), and a transmission minimum T3c for the filter 19 coinciding with the emission peak E3. Both filters 17 and 19 are transmitting at other wavelengths as indicated by a maximum transmission level T3b.

A 'truth table' may be constructed as follows to summarize how colors corresponding to E1, E2 and E3 may be selectively transmitted to an eye 21 of an observer in front of the filter 19.

| STATE OF FILTER 17 | STATE OF FILTER 19 | COLOR TRANSMITTED TO EYE 21 |
| --- | --- | --- |
| A | A | E1 + E3 |
| A | B | E1 |
| B | A | E3 |
| B | B | E2 |

If both filters 17 and 19 are in the A state then E1 and E3 are transmitted together. If the position of the peaks E1 and E3 are carefully chosen however, eg by the use of one or more filters (not shown) having fixed transmission characteristics, so that E1 and E3 are color complements of one another then the light observed by the eye 21 will be white.

If the filter 17 is in the A state while filter 19 is in the B state then only the emission peak E1 will be transmitted by the combination at the transmission peak T1 of filter 17.

If filter 19 is in the A state while filter 17 is in the B state then only the emission peak E3 will be transmitted by the combination at the transmission peak T2.

If both filters 17 and 19 are in the B state then the combination transmits at wavelengths other than those of the transmission minima T3a and T3c. In other words the combination transmits the emission peak E2 at the transmission maximum T3b, and E2 has been repeated in FIG. 3c to illustrate this.

The television system shown in FIG. 2 and described with reference to FIGS. 3a to 3c is preferably operated in a frame sequential mode. This means that a first video signal representing information in one color corresponding to E1, eg red, is first applied to energise the screen 15 and a complete picture frame, e.g. 625 lines, is built up from the first video signal. A second video signal representing another color corresponding to E2, eg green, follows directly after the first video signal, and a complete picture frame is built up from the second video signal. A third video signal representing a third color corresponding to E3, eg blue, follows directly after the second video signal, and a complete picture frame is built up from the third video signal, and so on. The frame rate is fast (eg >100 Hz) enough to allow the observer to imagine that he see a single three-colored picture from the three separate kinds of frame.

Preferably, fast switching between the A and B states of the filters 17 and 19 is achieved in a way known as the 'two frequency' method, described in copending United Kingdom Patent Application No. 44941/73, by switching the frequency of an a.c. signal so as to change the dielectric anisotropy of the liquid crystal layers (not shown specifically) used in the filters 17 and 19 from positive to negative. For example 'Merck W1' material has a dielectric anisotropy which changes at 12 kHz. Thus, if this material is used and the filters 17, 19 are filters of the kind X described above then color transmission switching of the filter 17, 19 may be obtained by switching between frequencies of eg 9 kHz and 15 kHz.

FIG. 4 shows part of the construction (the display part), and FIGS. 5a to 5e illustrate the operation of an alternative color television system using only one liquid crystal filter 27. A filter composite 25 is located behind the liquid crystal filter 27, and a light emitting screen 23, eg a P22 mixed colour phosphor, is located behind the filter composite.

The filter 27, the composite 25 and the screen 23 are shown separate for clarity but in practice they will be touching to form a sandwich structure.

The filter composite 25 consists of alternate stripes 25a, 25b respectively of a first kind of filter, denoted by hatched rectangles in FIG. 4, and a second kind of filter, denoted by blank rectangles. The two kinds of stripes 25a, 25b both have fixed transmission characteristics, but the characteristics are different in the two cases as described below.

Figure 5A:
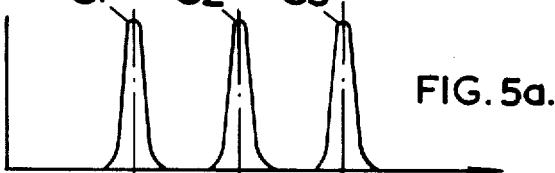
Figure 5B:
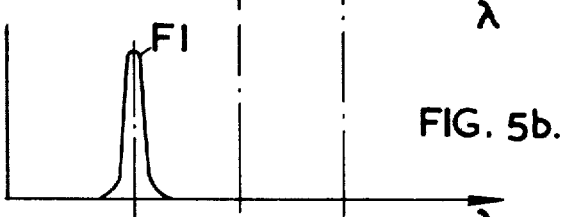
Figure 5C:
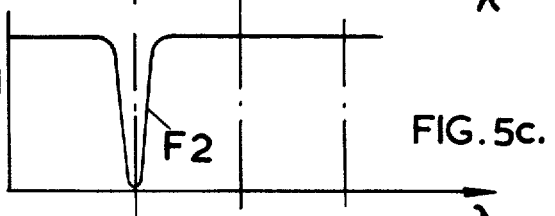
Figure 5D:
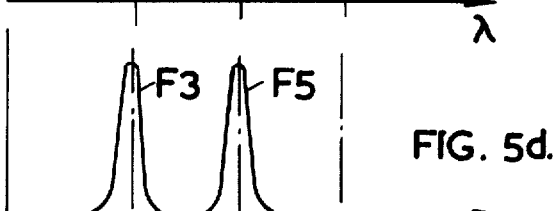
Figure 5E:
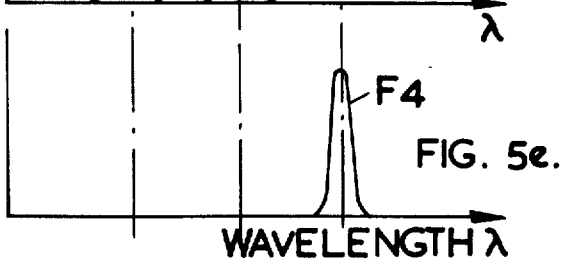

The screen 23 has three emission peaks C1, C2, C3 at different wavelength λ as shown in FIG. 5a. The liquid crystal filter 27 has two states referred to as first and second states, which provide separately a transmission peak F1 as shown in FIG. 5b and a transmission minimum F2 as shown in FIG. 5c, both coinciding with the emission peak C1. The stripes 25a transmit C2 at a transmission peak F5, but do not transmit C3. The stripes 25b transmit C3 at a transmission peak F4 but not C2. One or both sets of the stripes 25a, 25b must also transmit C1 and the drawing shows the stripes 25a transmitting C1 at transmission peak F3.

Three colors corresponding to the emission peaks C1, C2 and C3 may be displayed as follows.

The color corresponding to the emission peak C1 is displayed with the liquid crystal filter 27 in its first state as shown in FIG. 5b.

The color corresponding to the emission peak C2 is displayed with the liquid crystal filter 27 in its second state as shown in FIG. 5c and with the screen 23 selectively energized to emit light only in regions corresponding to stripes (not shown) immediately adjacent to the stripes 25a.

The color corresponding to the emission peak C3 is displayed with the liquid crystal filter 27 in its second state as shown in FIG. 5c and with the screen 23 selectively energized to emit light only in striped regions corresponding to stripes (not shown) immediately adjacent to the stripes 25b.

For example, one method of selectively energizing a cathode ray tube having the screen 23 as its phosphor is as follows. The total number of stripes 25a, 25b equals the number of television lines and the stripes 25a, 25b coincide with the television lines. Three color video signals are applied frame sequentially to the tube as described above. While the first signal is applied, the liquid crystal filter 27 is in its first state (FIG. 5b) and only C1 is transmitted. While the second and third signals are separately applied, the liquid crystal filter 27 is in its second state (FIG. 5c). The second signal only carries information on the television lines which correspond to the stripes 25a and is zero on the lines which correspond to the stripes 25b. The third signal only carries information on the television lines which correspond to the stripes 25b and is zero on the lines which correspond to the stripes 25a.

The first video signal may also be zero on alternate television lines so that the color corresponding to the emission peak C1 does not dominate the other two.

The stripes may for example be formed from two different dichroic dyes, eg Sudan Black (Color Index No. 26150) which transmits blue and green but not red and Sudan Red, (Color Index No 26105) which transmits red but not blue. The dyes may be printed on a sheet of plastics material to form the alternate stripes such as in the way described in copending United Kingdom Patent Application No. 52123/74 by dissolving the dyes separately in liquid crystal materials, eg a cyanobiphenyl, and then printing the dye/liquid solutions on the plastics material, which may for example be 'Celgard 2400°, in stripes and allowing the liquid crystal material to diffuse into the pores in the plastics material leaving the dye stripes on the surface. The plastics sheet is appropriately aligned in front of the light emitting screen.

We claim:

1. A color television display system including a light emitting screen capable of being energized to emit light in the form of a visual image in three colors E1, E2 and E3 of the visible spectrum, means for applying different kinds of input signal to energize said screen, said input signals being video signals representing colors, an electrically controllable filter located in front of said screen, said filter comprising in combination a polarizer, an analyzer and a liquid crystal layer having an electrically adjustable optical activity whereby electrical variation of the optical activity changes the color passed by said analyzer, said filter being capable of separately passing at least two of the colors emitted by the screen, an electrode structure for applying an electric field across said layer, and means for controlling said electric field to change the optical activity of said liquid crystal layer whereby light emitted by said screen is passed in different colors one color at a time by said filter, the passed color being selected to correspond to the input signal applied to energize said screen, said system additionally comprising a further liquid crystal filter located in front of said screen, said first mentioned filter having a first state which passes only color E1 and a second state which prohibits color E1 from passing, and said further filter having a first state which passes only color E3 and a second state which prohibits color E3 from passing, at least one of said second states passing color E2.

2. A system as in claim 1 and wherein said system incorporates a cathode ray tube and said screen is a phosphor screen of said tube.

3. A system as in claim 1 and wherein said means for applying input signals is arranged to apply said different video signals whereby said colors E1, E2 and E3 are emitted frame sequentially by said screen and wherein said means for controlling said electric field is arranged to control also said further filter whereby said three colors E1, E2 and E3 are sequentially passed by said filters in synchronism with the corresponding frames.

4. The system of claim 1 wherein said first mentioned filter is of the kind in which said layer of liquid crystal material includes a nematic material whose molecules are arranged in a twisted configuration and in which a layer of birefringent material is included between said polarizer and analyzer to determine the colors passed by said analyzer for different optical activities of said liquid crystal layer.

5. A color television system including a light emitting screen capable of being energized to emit light in the form of a visual image in three colors $C_1$, $C_2$ and $C_3$ of the visible spectrum, means for applying different video signals representing different colors to energize said screen, an electrically controllable filter located in front of said screen, said filter comprising in combination a polarizer, an analyzer and a liquid crystal layer having an electrically adjustable optical activity whereby electrical variation of the optical activity changes the color passed by said analyzer, said filter being capable of separately passing at least two of the colors emitted by the screen, an electrode structure for applying an electric field across said layer, and means for controlling said electric field to change the optical activity of said liquid crystal layer whereby light emitted by said screen is passed in different colors one color at a time by said filter, the passed color being selected to correspond to the input signal applied to energize said screen, said system additionally comprising in front of said screen a series of first stripes of a first additional filter having a fixed transmission characteristic and a series of second stripes of a second additional filter having a fixed transmission characteristic different from that of the first additional filter, the first and second stripes alternating with one another, the first mentioned filter having a first state which passes only color C1 and a second state which prohibits color C1 from passing, the first additional filter passing color C2 but prohibiting color C3 from passing, and the second additional filter passing color C3 but prohibiting color C2 from passing, at least one of said additional filters also passing color C1.

6. A system as in claim 5 and wherein said screen is arranged to be energized by said means for applying input signals whereby said colors C1, C2 and C3 are emitted frame sequentially in C1, C2 and C3 frames, wherein said means for controlling said electric field is arranged so as to pass color C1 in synchronism with said C1 frames but not said C2 and C3 frames, and wherein said means for applying said input signals is arranged to energize said screen in selective lines whereby said screen is energized only in lines adjacent said first stripes in said C2 frames and only in lines adjacent said second stripes in said C3 frames.

* * * * *